United States Patent
Mueller-Mach et al.

(10) Patent No.: US 6,844,903 B2
(45) Date of Patent: Jan. 18, 2005

(54) BLUE BACKLIGHT AND PHOSPHOR LAYER FOR A COLOR LCD

(75) Inventors: Regina Mueller-Mach, San Jose, CA (US); Gerd O. Mueller, San Jose, CA (US)

(73) Assignee: Lumileds Lighting U.S., LLC, San Jose, CA (US)

( * ) Notice: Subject to any disclaimer, the term of this patent is extended or adjusted under 35 U.S.C. 154(b) by 499 days.

(21) Appl. No.: 09/827,023

(22) Filed: Apr. 4, 2001

(65) Prior Publication Data

US 2002/0145685 A1 Oct. 10, 2002

(51) Int. Cl.⁷ .......................................... G02F 1/1335
(52) U.S. Cl. ...................................................... 349/70
(58) Field of Search ................. 349/61, 70; 257/79; 385/4

(56) References Cited

U.S. PATENT DOCUMENTS

| | | | | |
|---|---|---|---|---|
| 5,608,554 A | * | 3/1997 | Do | 349/70 |
| 6,078,704 A | * | 6/2000 | Bischel | 385/4 |
| 6,252,254 B1 | * | 6/2001 | Soules et al. | 257/89 |
| 6,501,100 B1 | * | 12/2002 | Srivastava et al. | 257/79 |

* cited by examiner

Primary Examiner—John F. Niebling
Assistant Examiner—Andre' C. Stevenson
(74) Attorney, Agent, or Firm—Patent Law Group LLP; Brian D. Ogonowsky

(57) ABSTRACT

A color, transmissive LCD uses a backlight that supplies a uniform blue light to the back of the liquid crystal layer in an LCD. The blue light, after being modulated by the liquid crystal layer, is then incident on the back surface of phosphor material located above the liquid crystal layer. A first phosphor material, when irradiated with the blue light, generates red light for the red pixel areas of the display, and a second phosphor material, when irradiated with the blue light, generates green light for the green pixel areas of the display. No phosphor is deposited over the blue pixel areas.

15 Claims, 2 Drawing Sheets

BLUE BACKLIGHT AND PHOSPHOR LAYER FOR A COLOR LCD

FIELD OF THE INVENTION

This invention relates to color liquid crystal displays and, in particular, to a technique for backlighting a color liquid crystal display.

BACKGROUND

Liquid crystal displays (LCDs) are commonly used in battery operated equipment, such as cell phones, personal digital assistants (PDAs), and laptop computers, and are replacing bulky CRTs as television screens and computer monitors. Presently, drawbacks of such LCDs include limited brightness, low efficiency, and limited viewing angle. LCDs can be monochrome or color and can be transmissive or reflective. The present invention deals with a color, transmissive LCD that uses backlighting.

FIG. 1 is a cross-sectional view of a small portion of a prior art color, transmissive LCD. There are other types of color, transmissive LCD structures. The structure of FIG. 1 will be used to identify certain disadvantages of prior art LCDs that are avoided by the present invention.

In FIG. 1, an LCD 10 includes a white light source 12 to provide backlighting for the upper LCD layers. A common source for white light is a fluorescent bulb. Another white light source is a combination of red, green, and blue light emitting diodes (LEDs) whose combined light forms white light. Other white light sources are known. These white light sources must provide homogeneous light to the back surface of the display.

A popular technique for providing such a homogeneous white light is to optically couple the fluorescent bulb or LEDs to a light guide, such as by optically coupling the light source to one or more edges of a sheet of clear plastic. The sheet has deformities that bend the light approximately normal to the top surface of the sheet so that light is emitted from the surface. Examples of such deformities include ridges in the bottom surface, reflective particles embedded into the plastic sheet, or a roughening of the top or bottom surface of the sheet. The deformities cause a quasi-uniform plane of light to be emitted out the front surface of the light guide. A non-specular reflector may be placed behind the back surface of the light guide to improve brightness and uniformity.

It is also common to not use any light guide but position a light source behind the display with appropriate diffusers to uniformly distribute the light across the display.

A polarizing filter 14 linearly polarizes the white light. The polarized white light is then transmitted to a transparent thin film transistor (TFT) array 16 having one transistor for each pixel. TFT arrays are extremely well known and need not be further described.

The light output from the TFT array 16 is then filtered by an RGB pixel filter 18. The RGB filter 18 can be located at other positions in the stack. The RGB pixel filter 18 may be comprised of a red filter layer, a green filter layer, and a blue filter layer. The layers may be deposited as thin films. As an example, the red filter contains an array of red light filter areas defining the red pixel areas of the display. The remaining portions of the red filter are clear to allow other light to pass. Accordingly, the RGB pixel filter 18 provides a filter for each R, G, and B pixel in the display.

Above the RGB pixel filter 18 is a liquid crystal layer 20, and above liquid crystal layer 20 is a transparent conductive layer 22 connected to ground. The absence of an electrical field across a pixel area of the liquid crystal layer 20 causes light passing through that pixel area to have its polarization rotated orthogonal to the incoming polarization. An electrical field across a pixel area of the liquid crystal layer 20 causes the liquid crystals to align and not affect the polarization of light. Selectively energizing the transistors controls the local electric fields across the liquid crystal layer 20.

A polarizing filter 24 only passes polarized light orthogonal to the light output from the polarizing filter 14. Therefore, the polarizing filter 24 only passes light that has been polarized by a non-energized pixel area in the liquid crystal layer 20 and absorbs all light that passes through the energized portions of the liquid crystal layer 20. The magnitudes of the electric fields across the liquid crystal layer 20 control the brightness of the individual R, G, and B components to create any color. In this manner, any color image may be presented to the viewer by selectively energizing the various transistors in the TFT array 16.

Other types of LCDs substitute a passive conductor grid for the TFT array 16, where energizing a particular row conductor and column conductor energizes a pixel area of the liquid crystal layer at the cross-point. Other types of LCDs do not use polarizing filters.

The RGB pixel filter 18 inherently filters off two-thirds of all light reaching it, since each filter only allows one of the three primary colors to pass. This is a significant factor in the generally poor efficiency of the prior art LCDs. The overall transmissivity of the LCD layers above the white light source 12 is on the order of 4–10%.

What is needed is a technique for increasing the brightness of an LCD output without requiring additional energy for the light source.

Another problem with a backlight outputting R, G, and B components is that the liquid crystal layer needs to have consistent properties for all the visible wavelengths. Optimizing the shutter function of the liquid crystal layer for each color is not possible, and a non-optimum compromise for each color must be made. Also, angular viewability and changes of color with viewing angle have always been issues with conventional LCDs. In order to increase the viewing angle, both the liquid crystal layer and the backlight have to be tailored to emit light through a broad range of angles. However, the wider the output light angle, the poorer the modulating efficiency of the liquid crystal layer.

What is also needed is a technique to improve the optical qualities of the liquid crystal layer.

An alternative LCD uses as a backlight a UV source and a phosphor-coated plate that emits a white light when energized by the UV. However, UV can be hazardous, and the LC and plastics deteriorate rapidly when exposed to UV. Suitable UV sources are also relatively expensive.

SUMMARY

In one embodiment, a color, transmissive LCD uses a backlight that supplies a uniform blue light to the back of the liquid crystal layer in an LCD. Any technique for providing the uniform blue light may be suitable. Preferably, this light should be collimated along the normal of the LCD plane.

The blue light, after being modulated by the liquid crystal layer, is then incident on the back surface of phosphor material located above the liquid crystal layer. A first phosphor material is deposited in the red pixel areas of the display. This first phosphor material is excited by the blue light output from the liquid crystal layer and generates red light. A second phosphor material is applied in the green pixel areas of the display and, when irradiated with the blue light, generates green light. No phosphor is deposited over the blue pixel areas. In this manner, the LCD can display any combination of colors by controlling the liquid crystal layer.

Since the liquid crystal layer only modulates a single color, the liquid crystal layer can be optimized for a particular wavelength, such as 460 nm. If the blue backlight is collimated, the liquid crystal layer can be optimized for a narrow cone of light. No color filters are necessary. A thin film phosphor for the red and green pixels provides a relatively wide viewing angle, just as in a CRT. Scattering elements in the blue pixel areas can be used to provide the same viewing angle as the red and green pixels. Since the backlight only outputs a single color, problems with generating a white light using R, G, and B LEDs are avoided.

BRIEF DESCRIPTION OF THE DRAWINGS

Elements in the various figures designated by the same numerals may be similar or identical to one another.

DETAILED DESCRIPTION

Figure 2:
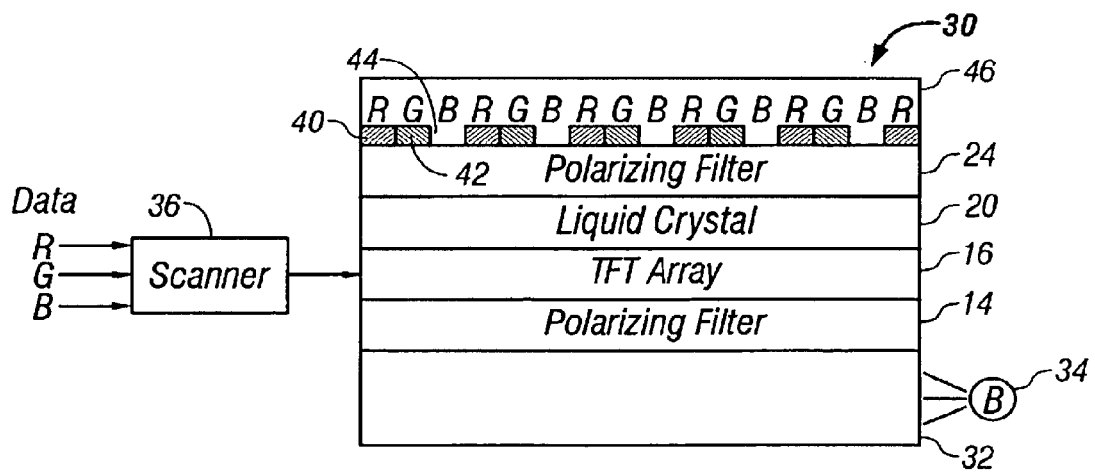
FIG. 2 is a cross-section of an LCD using a blue light source and a phosphor layer to convert blue light to red and green pixels.

FIG. 2 is a cross-section of a portion of an LCD 30 in accordance with one embodiment of the invention. Other embodiments may include additional, well known features such as wavelength-dependent phase retarders and diffusers to increase the viewing angle.

The LCD includes a light guide 32, which may be conventional. A blue light LED 34 is optically coupled to an edge of the light guide 32, and deformities are formed in or on a surface of the light guide 32 to leak out the blue light through the upper surface of the light guide 32. The light guide may also be a diffuser with the blue light source located behind the diffuser. Lenses may be formed on the top surface of the light guide 32 to collimate the light output from the light guide 32. Numerous types of well known light guides or defusers may be used to output the blue light. Preferably, the blue light output is non-Lambertian, forward collimated. In one embodiment, the blue light LED 34 outputs blue light with a wavelength of 460 nm.

A conventional scanner 36, well known to those skilled in the art, receives red, green, and blue data from a conventional circuit and selectively energizes the transistors in the TFT array 16 using known row and column addressing circuitry. The blue light from light guide 32 is polarized by filter 14. The TFT array 16 then selectively energizes areas of the liquid crystal layer 20 to selectively shutter (i.e., polarize or pass) the blue light incident on the bottom surface of the liquid crystal layer 20. The polarizing filter 24 then passes any of the blue light polarized by the liquid crystal layer 20 and absorbs any blue light that has not been polarized by the liquid crystal layer 20.

The modulated blue light output from the polarizing filter 24 is then applied to phosphors deposited in areas coinciding with the red and green pixels. The red phosphor 40 may be $SrS:Eu^{2+}$. The green phosphor 42 may be $SrGa_2S_4:Eu^{2+}$. These phosphors are the same as those deposited on lenses of blue LEDs to form white light (having R, G, and B components) and may have up to 100% quantum efficiency. These phosphors are nicely excitable by the 460 nm blue from commercially available blue LEDs. For areas 44 of the display coinciding with blue pixels, there is no phosphor. In one embodiment, a suitable diffuser (e.g., scattering powder) is located at the blue pixel areas so the blue pixels match the viewing angle properties of the red and green pixels.

The phosphor may be deposited from liquid suspension using a stencil. The phosphor may be deposited over the polarizing filter, or the phosphor may be deposited over a transparent film. A transparent protective layer 46 overlies the phosphor layer. The transparent layer 46 may employ scattering elements (e.g., roughening of its surface) to increase the viewing angle of the blue pixels.

Figure 3:
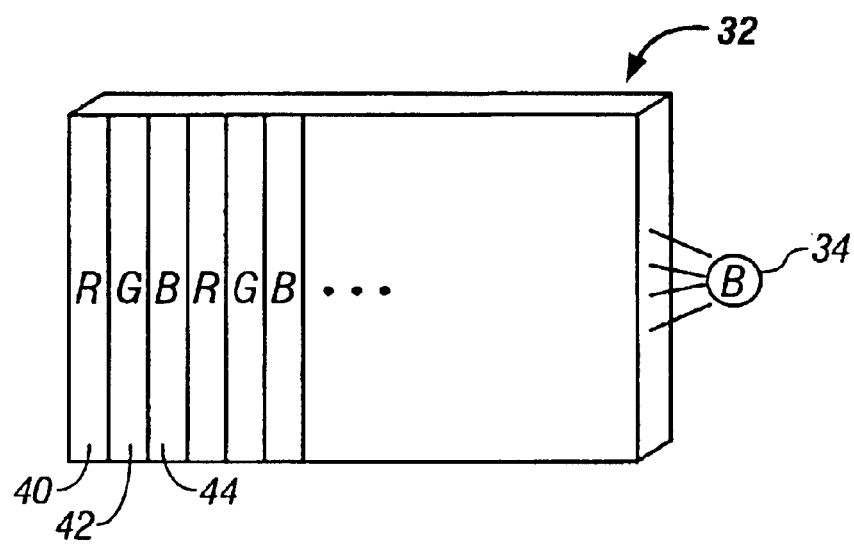
FIG. 3 is a perspective view of a red and green phosphor pattern applied on either a surface of a separate transparent layer or deposited on the surface of the polarizing filter.

This technique may be used for any pixel pattern. In one known pixel pattern, the display pixels for a particular color are arranged in columns. In such a display, the phosphor material for the red and green pixels may be formed as strips, as shown in FIG. 3, with the blue areas not having any phosphor coating. To improve the separation between pixels, the phosphor material for each pixel may be isolated from all other phosphor material. Additionally or alternatively, a grid mask (also called a black matrix) may be formed overlying or underlying the phosphor layers to provide an opaque gap between each of the pixels to reduce cross-talk.

Figure 4:
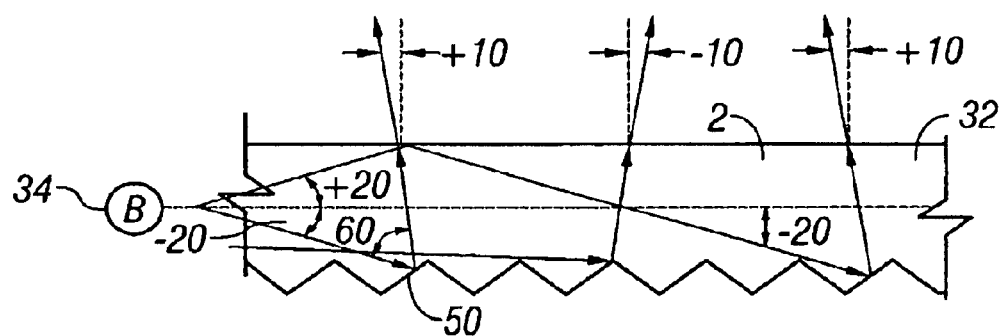
FIG. 4 is a cross-section of a portion of a backlight illustrating one technique for "leaking out" blue light from a light guide.

FIG. 4 is a cross-sectional view of a small portion of the light guide 32 illustrating one of a variety of well known techniques for leaking out light through the upper surface of the light guide 32. In FIG. 4, the deformities in the light guide 32 are ridges 50 formed in the back surface of the light guide 32 that reflect light to the top surface of the light guide 32. Light incident on the top surface of the light guide 32 at less than the critical angle escapes from the light guide.

Light guide 32 can be tuned or optimized for a narrow blue band, and forward collimation and/or polarization can be achieved by the light guide by suitable design, eliminating the need for the lower polarizing filter 14.

The deformities in the light guide 32 may take various shapes and may be formed in the light guide surface or internal to the light guide Examples of deformities are described in U.S. Pat. Nos. 6,072,551; 5,876,107; 5,857,761; and 4,573,766, all incorporated herein by reference.

Standard pixel arrangements for monitors and the like include an HDTV standard of 1280×1024 pixels or lower resolutions of 640×480 and 320×240. The pitch of the pixels is of course determined by the desired size of the LCD and the number of pixels. For simple displays, such as in cell phones, fewer pixels may be acceptable.

In some types of LCDs, polarizing filters are not needed. The present invention is also suitable for use in those types of LCDs.

Additional information about liquid crystal displays may be found in the books entitled "Liquid Crystal Flat Panel Displays," by William O'Mara, 1993, published by Van Nostrand Reinhold, and "Color TFT Liquid Crystal Displays," by T. Yamazaki, published by SEMI, incorporated herein by reference.

Figure 1:
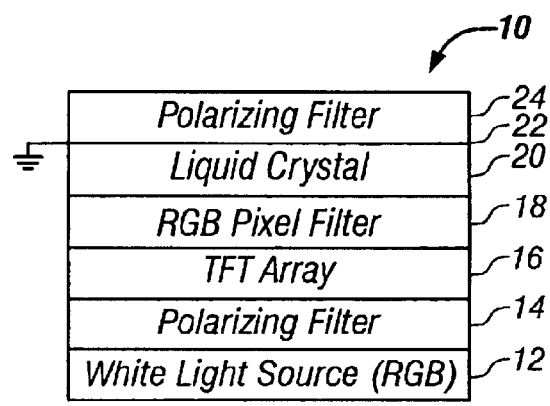
FIG. 1 is a cross-section of a prior art color transmissive LCD using a white light source.

Using the technique shown in FIG. 2, the 66% loss incurred by the RGB filter 18 of FIG. 1 is eliminated. Advantages of this technique over backlighting an LCD with a light source having R, G, and B components include:

Optimization of the LCD for one color (e.g., 460 nm)

No color filter is necessary

Improved viewing angle due to the Lambertian emission from powder phosphors or thin film phosphors (the viewing angle of the blue pixels can be made to match the red and green pixel viewing angles by providing light scattering elements in front of the blue pixels)

Only identical LEDs are used to feed into the light guide or defused, avoiding problems with proper color mixing, different emission cones, different temperature dependence, and different aging characteristics of different color LEDs Using an LED as the light source allows for an instant on display having a long lifetime and using low voltage Dimming to adjust for ambient light changes can easily be accomplished by lowering the drive current of the blue LEDs or by reducing the duty cycle, as the phosphors work in proportion to the blue light exciting them, and their decay time is below one microsecond, well below any reasonable pulse width in duty cycles schemes Numerous issued patents describing light guides and LCDs provide techniques for improving light extraction efficiency, and any of these techniques may be employed, as appropriate, in the present invention. These patents include U.S. Pat. Nos. 6,094,283; 6,079,838; 6,078,704; 6,073,034; 6,072,551; 6,060,727; 6,057,966; 5,975,711; 5,883,684; 5,857,761; 5,841,494; 5,580,932; 5,479,328; 5,404,277; 5,202,950; 5,050,946; 4,929,062; and 4,573,766, all incorporated herein by reference.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A color liquid display comprising:

a backlight for outputting blue light;

a plurality of layers including a liquid crystal layer being intersected by said blue light, said liquid crystal layer for modulating said blue light;

a first phosphor material being irradiated by said blue light modulated by said liquid crystal layer, said first phosphor material, when irradiated by said blue light, generating red light, said first phosphor material being located in first areas overlying said plurality of layers constituting red pixels of said display;

a second phosphor material being irradiated by said blue light modulated by said liquid crystal layer, said second phosphor material, when irradiated by said blue light, generating green light, said second phosphor material being located in second areas overlying said plurality of layers constituting green pixels of said display; and third areas overlying said plurality of layers, constituting blue pixels, having no phosphor material to allow modulated blue light to pass.

2. The device of claim 1 further comprising at least one blue light emitting diode (LED) being optically coupled to said backlight.

3. The device of claim 1 wherein said plurality of layers comprises a polarizing filter overlying said liquid crystal layer, said first phosphor material and said second phosphor material overlying said polarizing layer.

4. The device of claim 1 wherein said plurality of layers comprises a thin film transistor array layer.

5. The device of claim 1 further comprising a diffusing material in said third areas.

6. The device of claim 1 wherein said backlight comprises a light guide having surface deformities to reflect light out of said light guide through a surface of said light guide.

7. The device of claim 1 wherein said backlight comprises a light guide having a first surface for emanating light and a side surface optically coupled to a blue light source.

8. The device of claim 1 wherein said blue light source is a blue LED.

9. The device of claim 1 wherein said first phosphor comprises $SrS:Eu^{2+}$.

10. The device of claim 1 wherein said second phosphor comprises $SrGa_2S_4:Eu^{2+}$.

11. The device of claim 1 wherein said first phosphor material and said second phosphor material are arranged in strips to constitute said red pixels and said green pixels, respectively.

12. A method for displaying color images comprising:

energizing at least one blue light emitting diode (LED) to output blue light from a backlight;

modulating said blue light by selectively controlling a liquid crystal layer intersected by said blue light;

irradiating a first phosphor material by said blue light modulated by said liquid crystal layer, said first phosphor material, when irradiated by said blue light, generating red light, said first phosphor material being located in first areas overlying said liquid crystal layer constituting red pixels of said displays;

irradiating a second phosphor material by said blue light modulated by said liquid crystal layer, said second phosphor material, when irradiated by said blue light, generating green light, said second phosphor material being located in second areas overlying said liquid crystal layer constituting green pixels of said display; and allowing said blue light modulated by said liquid crystal layer to pass through third areas, constituting blue pixels, overlying said liquid crystal layer, said third areas having no phosphor material.

13. The method of claim 12 further comprising polarizing light, using a polarizing filter, modulated by said liquid crystal layer, said first phosphor material and said second phosphor material overlying said polarizing layer.

14. The method of claim 12 further comprising diffusing blue light in said third areas.

15. The method of claim 12 wherein said irradiating said first phosphor material and irradiating said second phosphor material comprise irradiating strips of said first phosphor material and said second phosphor material constituting said red pixels and said green pixels, respectively.

* * * * *